United States Patent
Nakamura et al.

(10) Patent No.: US 12,117,880 B2
(45) Date of Patent: Oct. 15, 2024

(54) INFORMATION PROCESSING APPARATUS AND CONTROL METHOD

(71) Applicant: Lenovo (Singapore) Pte. Ltd., Singapore (SG)

(72) Inventors: Atsunobu Nakamura, Kanagawa (JP); Akinori Uchino, Kanagawa (JP); Hiroki Oda, Kanagawa (JP); Tomoki Maruichi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 17/895,429

(22) Filed: Aug. 25, 2022

(65) Prior Publication Data

US 2023/0104672 A1    Apr. 6, 2023

(30) Foreign Application Priority Data

Oct. 4, 2021 (JP) .................................. 2021-163382

(51) Int. Cl.
*G06F 1/28* (2006.01)
*G06F 1/3293* (2019.01)
*G06F 1/3203* (2019.01)

(52) U.S. Cl.
CPC .............. *G06F 1/28* (2013.01); *G06F 1/3293* (2013.01); *G06F 1/3203* (2013.01)

(58) Field of Classification Search
CPC .......... G06F 1/206; G06F 1/28; G06F 1/3203; G06F 1/3215; G06F 1/3228; G06F 1/324; G06F 1/3293; G06F 1/3296; G06F 3/0482; G06F 3/04847; Y02D 10/00
See application file for complete search history.

(56) References Cited

U.S. PATENT DOCUMENTS

| | | | |
|---|---|---|---|
| 8,717,372 B1 | 5/2014 | Wyatt | |
| 2008/0034238 A1 | 2/2008 | Hendry et al. | |
| 2011/0252219 A1* | 10/2011 | Sonobe | G06F 1/206 |
| | | | 712/30 |
| 2013/0207984 A1 | 8/2013 | Walrath | |
| 2015/0286262 A1* | 10/2015 | Park | G06F 11/3058 |
| | | | 713/320 |

(Continued)

FOREIGN PATENT DOCUMENTS

| | | |
|---|---|---|
| JP | 2018-032147 A | 3/2018 |
| WO | 2020/205114 A1 | 10/2020 |

*Primary Examiner* — Jaweed A Abbaszadeh
*Assistant Examiner* — Brian J Corcoran
(74) *Attorney, Agent, or Firm* — Osha Bergman Watanabe & Burton LLP

(57) ABSTRACT

An information processing apparatus and an information processing method capable of fulfilling an image processing function expected in a selected power control mode are provided. The information processing apparatus includes a first processor, a second processor, and a power control unit that determines one power control mode from among a plurality of stages of power control modes different in rated power, and controls power consumption of the first processor and the second processor in the determined power control mode, wherein the power control unit stops an operation of the second processor in response to the determined power control mode being a low power control mode which is a power control mode with the rated power lower than predetermined rated power.

5 Claims, 7 Drawing Sheets

| Power Control Mode | | Low Noise (Q) | Balance (B) | High Performance (P) |
|---|---|---|---|---|
| Target Temperature [°C] | | TEM1 | TEM2 | TEM3 |
| Noise Upper Limit [dB SPL] | | SND1 | SND2 | SND3 |
| Set Power (W) | PL112 | P0112 | P0112 | P0112 |
| | PL132 | P0132 | P0132 | P0132 |
| | PL111 Upper Limit | P0111qu | P0111bu | P0111pu |
| | PL131 Upper Limit | P0131qu | P0131bu | P0131pu |
| | PL111 Lower Limit | P0111ql | P0111bl | P0111pl |
| | PL131 Lower Limit | P0131ql | P0131bl | P0131pl |

(56) References Cited

U.S. PATENT DOCUMENTS

| | | | |
|---|---|---|---|
| 2016/0093013 A1* | 3/2016 | Kaburlasos | G06F 1/26 345/501 |
| 2018/0293205 A1* | 10/2018 | Koker | G06F 13/4027 |
| 2021/0182066 A1 | 6/2021 | Shenoy et al. | |

* cited by examiner

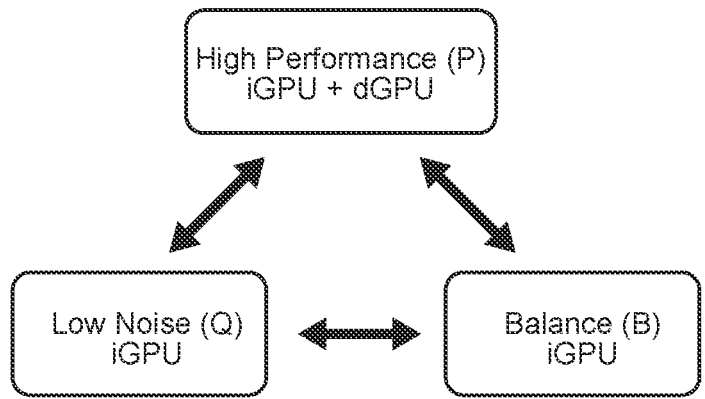

FIG. 4

| Power Control Mode | | Low Noise (Q) | Balance (B) | High Performance (P) |
|---|---|---|---|---|
| Target Temperature [°C] | | TEM1 | TEM2 | TEM3 |
| Noise Upper Limit [dB SPL] | | SND1 | SND2 | SND3 |
| Set Power (W) | PL112 | P0112 | P0112 | P0112 |
| | PL132 | P0132 | P0132 | P0132 |
| | PL111 Upper Limit | P0111qu | P0111bu | P0111pu |
| | PL131 Upper Limit | P0131qu | P0131bu | P0131pu |
| | PL111 Lower Limit | P0111ql | P0111bl | P0111pl |
| | PL131 Lower Limit | P0131ql | P0131bl | P0131pl |

FIG. 5

| Power Control Mode | State | Duration |
|---|---|---|
| High Performance [P] | Power ≥ SP113 | T113 |
| Balance [B] | Power ≥ SP112 | T112 |
| Low Noise [Q] | Power ≤ SP121 | T121 |
| Balance [B] | Power ≤ SP122 | T122 |

FIG. 6

| App | Processor | User Designation |
|---|---|---|
| APP01 | iGPU | — |
| APP02 | iGPU | — |
| APP03 | iGPU | O |
| APP04 | dGPU | — |
| APP05 | dGPU | O |

| Processor | Evaluation Value | Temperature |
|---|---|---|
| iGPU | SD01 | TM01 |
| iGPU (ON) + dGPU (OFF) | SD02 (≈SD01) | TM02 (≈TM01) |
| iGPU (ON) + dGPU (ON) | SD03 (< SD01, SD02) | TM02 (≈TM01, TM02) |

INFORMATION PROCESSING APPARATUS AND CONTROL METHOD

CROSS-REFERENCE TO RELATED APPLICATIONS

This application claims priority to Japanese Patent Application No. 2021-163382 filed on Oct. 4, 2021, the contents of which are hereby incorporated herein by reference in their entirety.

BACKGROUND OF THE INVENTION

Field of the Invention

The present invention relates to information processing apparatuses and control methods, and relates, for example, to an information processing apparatus capable of executing image processing.

Description of the Related Art

Information processing apparatuses such as personal computers (PCs) have an image processing function for displaying screens. Such an image processing function is also called a graphics function or a drawing function. The graphics function has become faster in speed and more multifunctional over time. The graphics function includes processing for each pixel constituting an image or for each block of such pixels, and the throughput tends to be large. It has been proposed to have an information processing apparatus equipped with a graphics processing unit (GPU) separate from a central processing unit (CPU). The CPU mainly performs arithmetic processing and control pertaining to the overall operation of the computer system. The GPU mainly performs arithmetic processing and control pertaining to the graphics function. The GPU may be integrated in the CPU or may be provided as a stand-alone element separate from the CPU. Generally, the latter provides more advanced image processing functionality. A GPU integrated or built in a CPU is also called an integrated GPU (iGPU) or an integrated graphics processor (IGP). A GPU that is separate from a CPU is also called a discrete GPU (dGPU), a separate GPU, or an external GPU.

For example, an information processing apparatus disclosed in Japanese Unexamined Patent Application Publication No. 2018-032147 includes a CPU and a GPU, and performs reproduction processing of performing image processing on moving image data and displaying it on a display unit. The CPU and the GPU perform image processing on each of frame images constituting the moving image data. The GPU is faster in processing speed than the CPU. The CPU selects part of an area of the frame image as a selected area according to a user instruction, and the GPU performs the image processing on the selected area. The CPU performs the image processing on an area other than the selected area.

In an information processing apparatus having a GPU separate from a CPU, the introduction of a switchable graphics (SWG) is being considered. The SWG is a function or a device that enables switching between an image processing function by an iGPU integrated in the CPU and an image processing function by a dGPU separate from the CPU. The SWG is expected to allow selecting full image processing functionality or suppressed power consumption.

There is generally a trade-off between the amount of power consumption and the processing power of a computer system. A computer system may allow selecting one of a plurality of stages of power control modes different in amount of power consumption, depending on the operating conditions or according to a user operation. However, the expected image processing function would not always be fulfilled according to the selected power control mode. As illustrated in FIG. 13, there were cases where in a power control mode with low rated power as in a low noise mode, the performance of image processing with the SWG was lower than the performance by the iGPU (dashed line). Further, in a stage where the amount of power consumption was smaller than a predetermined power consumption amount, the performance failed to improve even with an increased amount of power consumption of the system as a whole.

SUMMARY OF THE INVENTION

An information processing apparatus according to the first aspect of the present invention includes: a first processor; a second processor; and a power control unit that determines one power control mode from among a plurality of stages of power control modes different in rated power, and controls power consumption of the first processor and the second processor in the determined power control mode, wherein the power control unit stops an operation of the second processor in response to the determined power control mode being a low power control mode which is a power control mode with the rated power lower than predetermined rated power.

In the information processing apparatus described above, the power control unit may stop the operation of the second processor and use the first processor to execute image processing in response to the determined power control mode being the low power control mode, and may use the first and second processors to execute the image processing in response to a high power control mode with the rated power not lower than the predetermined rated power being instructed.

The information processing apparatus described above may include a storage unit that stores startup application information indicative of an application program that has been started, and may also include a setting unit that is operable, in response to the determined power control mode being the low power control mode, to set image processing setting information that indicates the first processor as a processor to execute image processing of an application program indicated by the startup application information, and, in response to the high power control mode being instructed, to erase the image processing setting information.

In the information processing apparatus described above, the setting unit may set, as user-designated image processing setting information, image processing setting information indicative of a processor to execute image processing of an application program instructed by a user operation, and may maintain the user-designated image processing setting information when the high power control mode is instructed.

In the information processing apparatus described above, the storage unit may store user designation information indicative of an application program for which the user-designated image processing setting information has been set.

In the information processing apparatus described above, the power control unit may cause image processing of an application program for which startup has been instructed to be executed by a processor instructed by the image processing setting information pertaining to the application program.

In the information processing apparatus described above, the first processor may be an integrated graphics processing unit integrated in a central processing unit, and the second processor may be a discrete graphics processing unit.

A control method according to the second aspect of the present invention is a method for an information processing apparatus including a first processor and a second processor, wherein the control method causes the information processing apparatus to execute: a first step of determining one power control mode from among a plurality of stages of power control modes different in rated power; a second step of controlling power consumption of the first processor and the second processor in the determined power control mode; and a third step of stopping an operation of the second processor in response to the one power control mode being a low power control mode which is a power control mode with the rated power lower than predetermined rated power.

The above-described aspects of the present invention can fulfill the expected image processing function in the selected power control mode.

BRIEF DESCRIPTION OF THE DRAWINGS

FIG. 4 is an explanatory diagram illustrating examples of power control modes according to the present embodiment;

FIG. 5 is a diagram illustrating an example of a power control table according to the present embodiment;

FIG. 6 is a diagram illustrating an example of a mode transition table according to the present embodiment;

DETAILED DESCRIPTION OF THE INVENTION

Embodiments of the present invention will be described below with reference to the drawings. First, the outline of an information processing apparatus 1 according to an embodiment will be described. In the following description, the case in which the information processing apparatus 1 is a laptop PC is mainly taken as an example. However, the information processing apparatus 1 is not necessarily limited to the laptop PC; it may be a desktop PC, a tablet terminal device, a smartphone, or the like. Further, in the information processing apparatus 1, either or both of an optical disk drive (ODD) 17 and a hard disk drive (HDD) 19 may be omitted.

Figure 1:
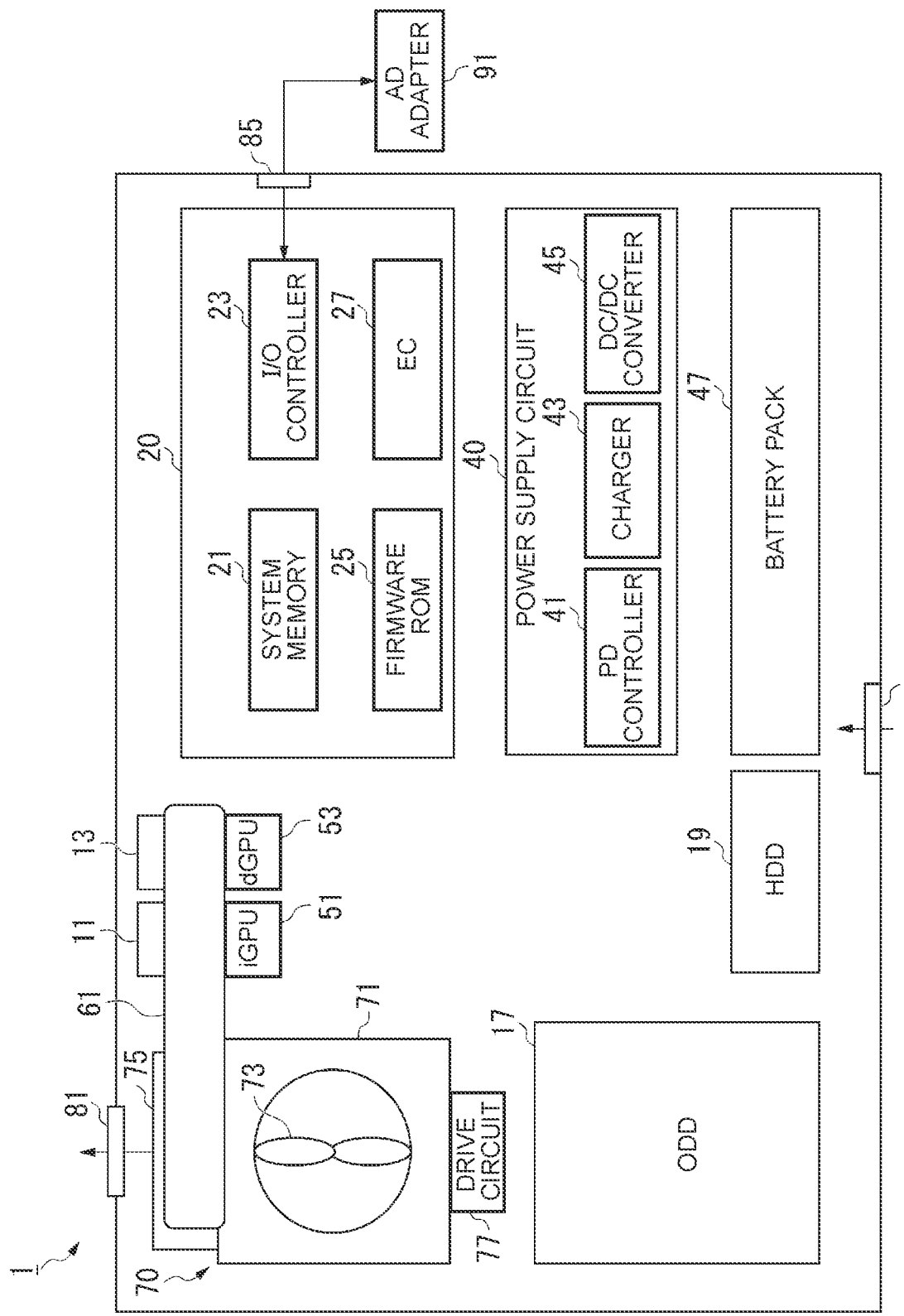
FIG. 1 is a plan view illustrating a hardware configuration example of an information processing apparatus according to an embodiment of the present invention.

FIG. 1 is a plan view illustrating a hardware configuration example of the information processing apparatus 1 according to the present embodiment.

In the information processing apparatus 1, the SWG has been introduced. The information processing apparatus 1 is configured to include an iGPU 11, a dGPU 13, an ODD 17, an HDD 19, a circuit board 20, a power supply circuit 40, a battery pack 47, and a heat dissipation unit 70, and each of these units is arranged inside a chassis.

The circuit board 20 has disposed thereon a system memory 21, an input/output (I/O) controller 23, a firmware read only memory (ROM) 25, and an embedded controller (EC) 27.

The system memory 21 is a storage medium used as a reading area of execution programs of the iGPU 11 or as a working area for writing therein processing data of the execution programs of the iGPU 11. The system memory 21 may also be called a main storage device, a main memory, or the like. The system memory 21 is configured to include, for example, one or more dynamic random access memory (DRAM) chips. The execution programs include an operating system (OS), various drivers for operating peripheral devices, and application programs (hereinafter, also called apps) for executing specific processing.

The system memory 21 may be shared between the iGPU 11 and another device (unified memory architecture (UMA)). For example, a common area may be provided in part of the storage area of the system memory 21. In the common area, an access from the dGPU 13, for example, as a device other than the iGPU 11 is permitted. Providing the common area eliminates the need of data transfer between devices, such as between the iGPU 11 and the dGPU 13. Besides the common area, an area as a reading area of execution programs dedicated to the dGPU 13 or a working area for writing therein processing data of the execution programs dedicated to the dGPU 13 may also be provided in other part of the storage area of the system memory 21.

The I/O controller 23 is connected to a data bus to control inputs and outputs between the components of the information processing apparatus 1 and inputs from and outputs to external devices. The I/O controller 23 is configured to include an I/O interface such as serial advanced technology attachment (SATA), universal serial bus (USB), peripheral component interconnect (PCI) Express, low pin count (LPC), or the like, and a real time clock (RTC).

The I/O controller 23 includes, for example, a USB interface compliant with the USB 3.2 standard (also called USB Type-C). The USB interface enables connection with an external device (for example, an alternating current-to-direct current (AD) adapter 91) through the USB to receive the supply of power from the connected external device. That is, the USB interface enables data to be input from and output to an external device through a signal line constituting the USB, and also enables power to be supplied from an external device through a power line constituting the USB.

The firmware ROM 25 stores in advance various system firmware, such as an I/O module, an authentication module, and the like. The I/O module includes a basic input/output system (BIOS), for example. The iGPU 11 reads the system firmware when the supply of power is started. The iGPU 11 executes processing instructed by instructions written in the system firmware. In the following description, executing processing instructed by instructions written in a program (which may be an app or an OS besides the system firmware) may also be expressed as "executing the program". Further, as used herein, that a hardware component, such as the iGPU 11, the dGPU 13, or other processor, performs processing instructed by instructions written in a program may also be expressed as the program performing the processing. For example, the iGPU 11 executes processing instructed by instructions written in the BIOS to control inputs and outputs of a system device (described later). This is expressed as "the BIOS controlling the inputs and outputs of the system device".

The EC 27 is a microcomputer configured to include a CPU, a ROM, a random access memory (RAM), and other hardware components, separate from the iGPU 11, the dGPU 13, and other processors. The EC 27 controls the operation of the power supply circuit 40 in accordance with an operating state of a main system 100 (described later), to control the supply of power to the devices that constitute the information processing apparatus 1. In the present embodiment, the EC 27 controls an input voltage of power supplied from the AD adapter 91 to a direct current-to-direct current (DC/DC) converter 45 of the power supply circuit 40 in accordance with the operating state of the main system 100. A system device means devices constituting the main system 100, and does not include the EC 27 or devices constituting a power supply system 300 (described later).

The power supply circuit 40 is configured to include a power delivery (PD) controller 41, a charger 43, and the DC/DC converter 45.

The PD controller 41 controls power supplied from the AD adapter 91 to the DC/DC converter 45.

The charger 43 controls the charge of power supplied from the AD adapter 91 to the battery pack 47. It should be noted that the power from the AD adapter 91 is supplied to the DC/DC converter 45. Part of the supplied power that has been left unconsumed is charged to the battery pack 47.

The DC/DC converter 45, which is a voltage converter that converts an input voltage of DC power supplied from the AD adapter 91, supplies a predetermined voltage of power obtained through the voltage conversion to each device of the information processing apparatus 1.

The battery pack 47 is charged with power left unconsumed out of the power supplied from the charger 43. The battery pack 47 is configured to include, for example, a lithium ion battery. In the case where no power is supplied from the AD adapter 91, the battery pack 47 discharges the charged power to supply it to the DC/DC converter 45. The battery pack 47 may be fixedly or detachably attached to the information processing apparatus 1.

The AD adapter 91 has one end electrically connected to an outlet of a commercial power supply and the other end electrically connected to the information processing apparatus 1 via a connector 85 thereof.

The AD adapter 91 converts AC power supplied from the commercial power supply into DC power. The AD adapter 91 supplies the converted DC power to the DC/DC converter 45 and the charger 43 via the connector 85.

In the example illustrated in FIG. 1, the AD adapter 91 is a separate body from the information processing apparatus 1, but the present invention is not limited to this. The AD adapter 91 may be incorporated in the chassis of, and integrated into, the information processing apparatus 1.

The heat dissipation unit 70 is configured to include a heat dissipation fan 73, a heat sink 75, and a drive circuit 77. The heat dissipation fan 73 is housed in a thin fan chamber 71. The heat dissipation fan 73 is a centrifugal heat dissipation fan that includes a rotating shaft, a fan motor to rotate the rotating shaft, and a plurality of blades. The blades are each attached to the rotating shaft. The heat sink 75, by way of heat exchange with the outside air, discharges the heat conducted to the own unit to the outside air. The heat sink 75 is arranged in a position to be in contact with an opening on a side face of the fan chamber 71 and an exhaust port 81 of the chassis. In response to rotation of the heat dissipation fan 73, the outside air flows from an air intake port 83 into a suction port of the fan chamber 71, passes through a plurality of fins formed in the heat sink 75 while absorbing heat radiated from the fins, and is discharged from the exhaust port 81.

A heat pipe 61 is arranged in contact with the heat sink 75 and heat receiving plates of the iGPU 11 and the dGPU 13 so as to be thermally coupled therewith.

In the information processing apparatus 1, temperature sensors 51 and 53 are installed. The temperature sensors 51 and 53 each detect the temperature of the own unit and output temperature data indicative of the detected temperature to the EC 27. In the example illustrated in FIG. 1, the temperature sensors 51 and 53 are placed in positions in contact with or in proximity to the surfaces of the iGPU 11 and the dGPU 13, respectively. Besides them, a plurality of temperature sensors may be placed on devices for which temperature control is required, positions to be frequently contacted by a human body, and other components, so that the respectively detected temperatures can be used for temperature control.

The iGPU 11 executes various arithmetic processing with program control, to control the overall operation of the information processing apparatus 1. The processing executed by the iGPU 11 may include image processing. The image processing may include processing (drawing) of generating display data and outputting it on a display of an HID 31 (described later).

The dGPU 13 executes image processing under the control of the iGPU 11. A display unit displays a display screen based on the display data input from the iGPU 11 or the dGPU 13. The display unit is, for example, a liquid crystal display.

The dGPU 13 is provided separate from the iGPU 11. The dGPU 13 has an image processing function which is generally faster than the image processing function of the iGPU 11. The iGPU 11 may control the necessity of the operation of the dGPU 13 depending on a power control mode and/or a load on the iGPU 11. The power consumption can be suppressed by stopping the operation of the dGPU 13. For example, the iGPU 11 maintains the operation of the iGPU 11 and stops the operation of the dGPU 13 in the case of a power control mode in which rated power is lower than predetermined rated power or in the case where the image processing load is less than a predetermined amount of load. In the case of a power control mode in which rated power is not less than the predetermined rated power or in the case where the image processing load is not less than the predetermined amount of load, the iGPU 11 makes the dGPU 13 operate while maintaining the operation of the iGPU 11. In this case, the image processing function in the iGPU 11 may be stopped. This achieves the advantages of both the iGPU 11 and the dGPU 13. The iGPU 11 and the dGPU 13 are connected to a data bus to enable mutual inputs and outputs of various data.

While power of a constant voltage is supplied from the DC/DC converter 45 to each of the iGPU 11 and the dGPU 13, power consumption is generally variable. The iGPU 11 and the dGPU 13 may make either or both of the operating voltage and the operating frequency variable depending on the power consumption. For example, the iGPU 11 executes system firmware to set, in a register included in each of the iGPU 11 and the dGPU 13, the maximum operating frequency allowed according to the operating state (operating mode) or the power control mode of the main system 100. When the operating frequency at that time is higher than the set maximum operating frequency, the iGPU 11 and the dGPU 13 each change the operating frequency step by step to be not higher than the set maximum operating frequency. When lowering the operating frequency, the iGPU 11 and the dGPU 13 may each lower the operating voltage to a value required for the operation of the own unit with that operating frequency (speed step). This leads to reduced power consumption of the iGPU 11 and the dGPU 13. In other words, the iGPU 11 and the dGPU 13 can increase the allowed maximum power consumption by increasing either one (e.g., operating frequency) or both of the operating voltage and the operating frequency.

Further, the iGPU 11 and the dGPU 13 may each perform an intermittent operation in which the start and stop of the operation is repeated at regular intervals, to make the average processing speed variable (throttling). The system firmware may be able to set, in the register of each of the iGPU 11 and the dGPU 13, throttling setting information indicative of the effectiveness of throttling and a duty ratio (throttling rate). The throttling also allows the processing power of the iGPU 11 and the dGPU 13 to be changed step by step. Such a change in processing power leads to a change in power consumption and, hence, a change in the amount of heat generated.

The iGPU 11 and the dGPU 13 may use both the speed step and the throttling in such a manner to execute the throttling while maintaining the lowest operating frequency by the speed step. In other words, the iGPU 11 and the dGPU 13 can set the maximum power consumption allowed by the determined operating frequency.

The iGPU 11 and the dGPU 13 perform the throttling so as to change the processing power of the own unit to one of a plurality of stages. The iGPU 11 and the dGPU 13 can make the power consumption increased as the throttling rate is increased.

In the following description, the processing power or the stage of the processing power of the iGPU 11 and the dGPU 13 that can be set variable by either or both of the speed step and the throttling is called a "performance step". The larger the value of the performance step, the higher the processing power will be. The higher the processing power, the larger the power consumption. For example, the value of the performance step being 100% indicates an operating state in which the processing power is maximized without being reduced.

The iGPU 11 and the dGPU 13 may each include a thermal control circuit (TCC). For example, the TCCs included in the iGPU 11 and the dGPU 13 monitor temperatures detected by the temperature sensors 51 and 53, respectively. The TCCs control the operations of the iGPU 11 and the dGPU 13, in a case where the detected temperature becomes higher than a predetermined reference temperature due to an increase in load, to suppress the temperature increase by lowering the operating frequency and the operating voltage or by performing the intermittent operation.

Since the iGPU 11 and the dGPU 13 are generally high in performance step and the power consumption increases with increasing usage rate, the amount of heat generated also increases. The iGPU 11 and the dGPU 13 each set a performance step corresponding to the power consumption that is not more than the allowed maximum power consumption, to operate such that the power consumption is not more than the set maximum power consumption. Therefore, the more the performance step is reduced, the longer the process execution time becomes, and the power consumption decreases. The heat generated by either or both of the iGPU 11 and the dGPU 13 raises their own temperatures and also raises the temperature inside and outside the chassis. However, the lower the power consumption, the smaller the amount of heat generated. Therefore, when the power consumption is low, the stop of a heat dissipation mechanism such as the heat dissipation fan 73 or the lowering of the output thereof is allowed. In other words, when the power consumption is high, the operation of the heat dissipation fan 73 or the increase of the output thereof is required.

Although the dGPU 13 operates under the control of the iGPU 11, the usage rate of the dGPU 13 does not generally have correlation with the usage rate of the iGPU 11. Therefore, when the usage rate of either one of the iGPU 11 and the dGPU 13 becomes high, there can be a case where heat dissipation is promoted by starting the operation of the heat dissipation mechanism or increasing the output thereof. In this case, the generation of heat by an increased usage rate of the other unit may be allowed. Conversely, when the heat dissipation mechanism is stopped or its output is reduced in response to a reduced usage rate of one of the iGPU 11 and the dGPU 13, heat dissipation is suppressed. This may create a need to reduce the usage rate of the other unit, as maintaining or increasing its usage rate is not acceptable.

Figure 2:
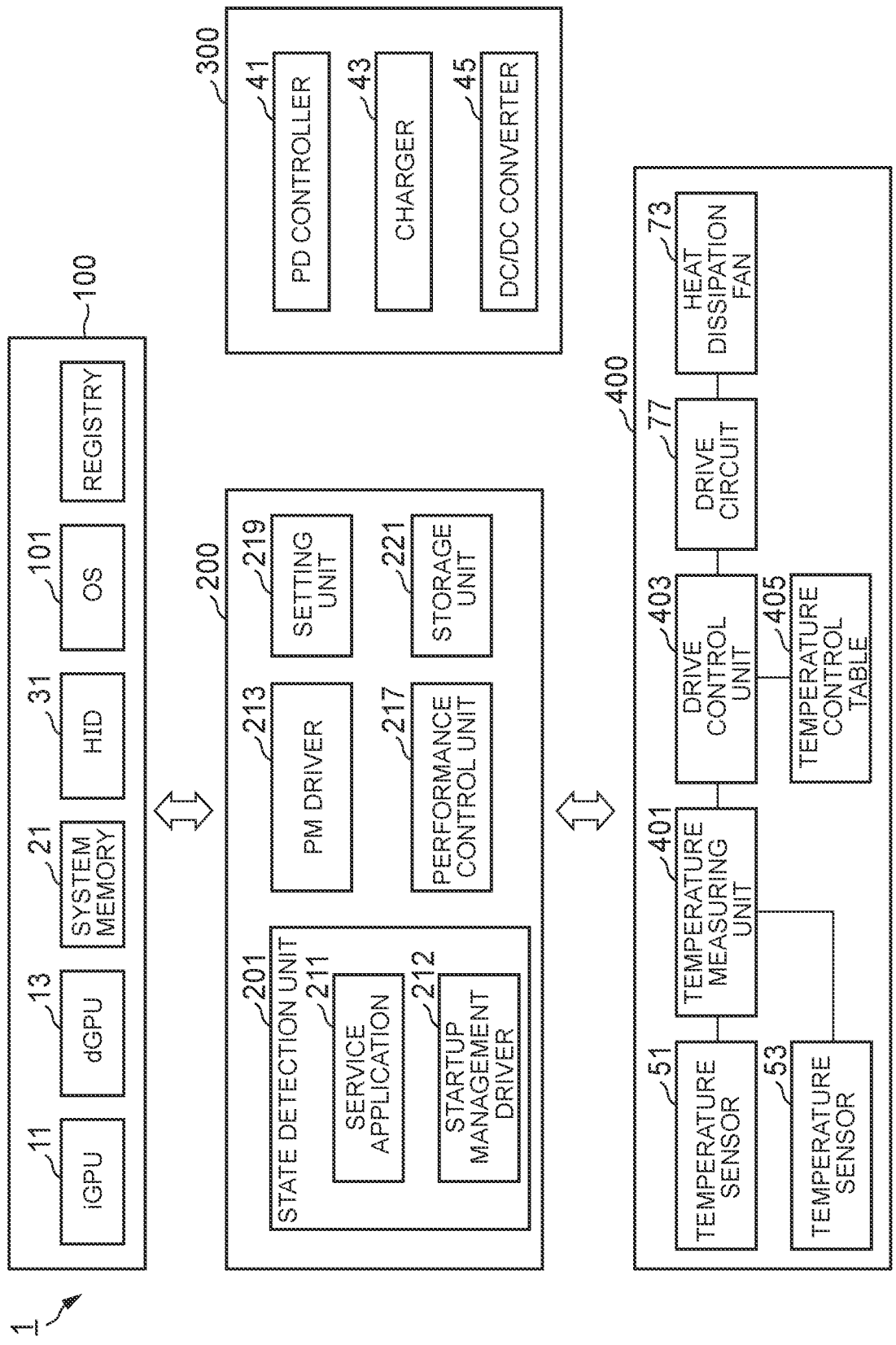
FIG. 2 is a block diagram illustrating a functional configuration example of the information processing apparatus according to the present embodiment.

A functional configuration of the information processing apparatus 1 according to the present embodiment will now be described. FIG. 2 is a block diagram illustrating a functional configuration example of the information processing apparatus 1 according to the present embodiment.

The information processing apparatus 1 includes the main system 100, a performance control system 200, a power supply system 300, and a temperature control system 400.

The main system 100 is a computer system configured to include the iGPU 11, the dGPU 13, the system memory 21, a human interface device (HID) 31, and other hardware, and an OS 101, a schedule task, and other software.

The iGPU 11 executes the OS 101, apps, and other software to fulfill the functions instructed by the software in collaboration with the dGPU 13, the system memory 21, the HID 31, and other hardware.

The dGPU 13 executes image processing in accordance with an image processing program in response to various commands provided from the iGPU 11. The image processing program may be part of an app or may be called by a command written in an app.

The HID 31 is configured to include input devices physically accessed by a user to perform input operations, such as a keyboard, a mouse, a touch screen, and the like, and output devices for presenting information to the user, such as a display, a speaker, and the like. The HID 31 is configured to be able to display various setting screens and generate operation information according to the operations accepted during the display. The setting screens include, for example, a graphics setting screen (image processing setting screen), and a power control mode setting screen. Specific examples of the setting screens will be described later.

The OS 101 is executed to provide basic functions. The basic functions include, for example, control of the execution states of apps and other programs, providing of a standard interface during execution of the programs, and the management of various resources in the main system 100 and in other hardware components connected directly or indirectly to the main system 100. The OS 101 may include graphics setting information (image processing setting information) indicative of a processor that is to execute image processing for a predetermined app. The graphics setting information may include information indicative of a power control mode in which the app is to be executed.

A configuration example of the performance control system 200 will now be described. The performance control system 200 is configured to include a state detection unit 201, a power management (PM) driver 213, a performance control unit 217, a setting unit 219, and a storage unit 221. The state detection unit 201 cooperates with a service application 211 executed by the iGPU 11 on the OS 101 and a middleware embedded in the kernel of the OS 101 to exert its functions, to acquire the states of the iGPU 11 and other processors. The middleware monitors processes generated in the iGPU 11 by the operation of the OS 101.

The service application 211, which is a state monitoring program executed by the iGPU 11 to monitor mainly the state of the iGPU 11 itself, provides part of the functions of the state detection unit 201. For example, the service application 211 acquires, from the OS 101, information on the power consumption of the iGPU 11. The service application 211 monitors the execution states of apps and other programs instructed by individual threads, including the creation or disappearance of threads. The service application 211 may also acquire parameters of average usage rate of the iGPU 11, presence or absence of user activity, disk access time, and the like during a predetermined monitoring time up to that point, and may use the acquired parameters to identify the operating state. For example, the service application 211 may recognize the start and end of execution of tasks pertaining to the apps and other programs on the basis of the parameters of the usage rate and power consumption of the iGPU 11, and the like.

The service application 211 may also detect the state of other processors such as the dGPU 13. As the state of the dGPU 13, the state detection unit 201 may acquire, for example, information indicative of the power consumption of the dGPU 13 and the operating state (ON) or the stopped state (OFF) of the dGPU 13, or may acquire temperature data that is output from the temperature sensor 53 via a temperature measuring unit 401 (described later).

The service application 211 outputs processor state information indicative of the detected states of the iGPU 11, the dGPU 13, and other processors, to the PM driver 213.

A startup management driver 212 is driver software that is executed by the iGPU 11 for providing some of the functions of the state detection unit 201. The startup management driver 212 identifies an app that has started running, i.e. the app that has been started, and stores startup application information indicative of the identified app in the storage unit 221. The app to be started may be instructed with operation information that is input from the HID 31 in response to acceptance of a user operation or input from the outside of the information processing apparatus 1.

The PM driver 213 is driver software for extracting, from various parameters constituting the processor state information input from the service application 211, parameters indicative of the states related to power consumption of the individual processors. The PM driver 213 outputs the processor state information including the extracted parameters to the performance control unit 217 and the PD controller 41.

The performance control unit 217 functions as a power control unit that controls the processing power of each of the iGPU 11 and the dGPU 13 on the basis of various setting information (described later) set by the setting unit 219 or on the basis of the processor state information input from the PM driver 213. The performance control unit 217 implements, for example, some of the functions obtained by the iGPU executing the system firmware.

It should be noted that the maximum power consumption, as a parameter pertaining to control of the processing power of a processor, includes a first power limit (hereinafter, PL1) and a second power limit (hereinafter, PL2). The PL1 corresponds to rated power. The PL1 is a threshold value that allows the power consumption to temporarily exceed this value but restricts the power consumption not to exceed this value continuously for a predetermined time or longer. The PL1 is also called a long term power limit. The PL2 is a threshold value that restricts the power consumption not to exceed this value even temporarily. The PL2 is also called a short term power limit. The PL2 corresponds to the upper limit of power consumption of a processor when the performance step is 100%. The PL1 and the PL2 are set for individual processors, that is, for each of the iGPU 11 and the dGPU 13. In the following description, PL1 and PL2 pertaining to the iGPU 11 may be called PL111 and PL112, respectively, and PL1 and PL2 pertaining to the dGPU 13 may be called PL131 and PL132, respectively, to distinguish therebetween.

When the power consumption of a processor exceeds the PL1 for a predetermined duration τ (e.g., 0.2 to 1 [s]) or longer, the performance control unit 217 reduces the performance step set at that time in the register of the processor until a moving average of the power consumption becomes the PL1 or less. Further, the performance control unit 217 increases the performance step set at that time in the register of the processor within a range in which the moving average of the power consumption does not exceed the The performance control unit 217 may make the PL1 variable between preset upper and lower limits of the PL1 in accordance with the changing tendency of the power consumption of the processor. For example, when a difference between the PL1 set at that time and the moving average of the power consumption becomes a predetermined difference threshold value or less, the performance control unit 217 increases the PL1. When the difference between the moving average of the power consumption and the PL1 set at that time becomes larger than the predetermined difference threshold value, the performance control unit 217 decreases the PL1.

In the register of the iGPU 11 or the system memory 21, a power control table is stored in advance. The power control table is control data configured to include a parameter set for each of N stages of power control modes (where N is an integer of 2 or more). The parameter set for each stage power control mode includes a range of PL1 (PL111 and PL131 in FIG. 5) and PL2 (PL112 and PL132 in FIG. 5). The PL1 range is represented by the lower limit and the upper limit. The PL1 range of the n+1-th stage power control mode (where n is an integer of 1 or more and N−1 or less) only needs to be a range indicating values larger than those in the PL1 range of the n-th stage power control mode as a whole. Further, the PL1 range of the n+1-th stage power control mode may be a range wider than the PL1 range of the n-th stage power control mode. The PL2 only needs to be a value not larger than the upper limit of the power consumption on the specifications of the processor. Here, the stages n of the power control modes only need to be set in ascending order of the PL1. Further, the PL2 may be a value common among the power control modes or may be an independent value.

The performance control unit 217 determines a power control mode of the main system 100 in accordance with the changing tendency of the operating state of the main system 100. When an excess period during which the power consumption of the main system 100 exceeds a first reference power (hereinafter, SP11) becomes a predetermined first period (hereinafter, T11, about 5 seconds to about 10 seconds) or longer, the performance control unit 217 changes the power control mode of the main system 100 at that time from any stage of the first stage or more and the n-th stage or less to the n+1-th stage. The power consumption of the main system 100 corresponds approximately to a sum of the power consumption of the iGPU 11 and the power consumption of the dGPU 13. The SP11 only needs to be, for example, a value lower by a predetermined determination width (e.g., 0.3 to 1.5 [W]) than a sum of the lower limit of the PL111 pertaining to the n-th stage power control mode of the iGPU 11 and the lower limit of the PL131 pertaining to that power control mode of the dGPU 13 at that time.

When an intra-reference period during which the power consumption of the main system 100 is not greater than a second reference power (hereinafter, SP12) becomes a predetermined second period (hereinafter, T12, about 5 seconds to about 30 seconds) or longer, the performance control unit 217 changes the power control mode at that time from any stage of the n+1-th stage or more and the N-th stage or less to the n-th stage. The SP12 only needs to be a value lower by a predetermined determination width (e.g., 0.3 to 1.5 [W]) than a sum of the lower limit of the PL111 and the lower limit of the PL131 pertaining to the n+1-th stage power control mode at that time. The SP12 pertaining to the n+1-th power control mode may be equal to or less than the SP11 at the n+1-th stage. Further, the SP12 pertaining to the n+1-th stage power control mode only needs to be a larger value than the SP12 at the n-th stage. The T12 may be equal to or longer than the T11. Setting the SP12 smaller or setting the T11 greater makes it more difficult to change the power control mode to a lower stage power control mode than to change it to a higher stage power control mode having a larger sum of the PL111 and the PL131. It is thus possible to prepare for an unexpected increase in power consumption.

The performance control unit 217 controls the power consumption in each processor so as not to exceed the value of the PL1 in the power control mode of that processor at that time for a predetermined period of time or longer and also not to exceed the PL2. The PL2 may be a value not smaller than the largest one of the values of the PL1 for each power control mode that the processor can take, or may be a common value among all the power control modes that the processor can take. Thus, even when the PL1 pertaining to the power control mode of the processor at that time is small, the PL2 equivalent to that of a power control mode in which the PL1 is larger is set, thereby allowing a temporary rise in power consumption. Therefore, as long as the power consumption is continuously low, the performance of the processor can be temporarily fulfilled without a change in the power control mode of the processor.

In the following description, conditions for changing to the n+1-th stage power control mode with higher PL1 may be called upgrading conditions (rank up conditions). The parameters pertaining to the upgrading conditions, i.e. SP11 and T11, may be called upgrading parameters. Further, conditions for changing to the n-th stage power control mode with lower PL1 may be called downgrading conditions (rank down conditions). The parameters pertaining to the downgrading conditions, i.e. SP12 and T12, may be called downgrading parameters. The upgrading and downgrading conditions may be collectively referred to as power mode transition conditions or simply as mode transition conditions. The upgrading and downgrading parameters may be collectively referred to as power mode transition parameters or simply as mode transition parameters.

Therefore, in the register of the iGPU 11 or the system memory 21, a mode transition table may be stored in advance, separate from the power control table. The mode transition table is configured to include information indicative of the mode transition conditions or the mode transition parameters for each power control mode after being changed. More specifically, SP11, T11, SP12, and T12 may be included in the mode transition table. However, SP12 and T12 may not be set for the first stage power control mode with the lowest rated power PL1. SP11 and T11 may not be set for the N-th stage power control mode with the highest PL1.

The performance control unit 217 refers to the mode transition table to identify, for each processor, the mode transition condition satisfied by the state of the processor, and changes the power control mode to the one pertaining to the identified mode transition condition. It should be noted that when the mode transition table includes no mode transition condition satisfied by the state of the processor at that time (floating state (float)), the performance control unit 217 may maintain the power control mode of the processor at that time without making any change. Exemplary changes of power control modes will be described later.

The performance control unit 217 refers to the power control table to identify, for each processor, the PL1 range and the PL2 pertaining to the power control mode at that time. The performance control unit 217 determines, for each processor, the above-described performance step using the identified PL1 range and PL2. The performance control unit 217 outputs power control mode information indicative of the determined power control mode to a drive control unit 403 (described later). Examples of the power control modes will be described later.

It should be noted that the performance control unit 217 may further control the processing power of a processor using the temperature of the processor input from a temperature measuring unit 401 (described later). For example, a control table indicating a performance step for each set of temperature and power consumption is preset in the register of the iGPU 11. The performance control unit 217 identifies the performance step corresponding to the temperature input to the iGPU 11 and the power consumption indicated by the obtained processor state information. The performance control unit 217 sets the identified performance step to the register of the iGPU 11. For the dGPU 13, as with the iGPU 11, the performance control unit 217 may identify the performance step corresponding to the temperature of the dGPU 13 and set the identified performance step to the register of the dGPU 13.

The power control mode of the main system 100 may be instructed by operation information input from the HID 31 or from the outside of the information processing apparatus 1. In such a case, the performance control unit 217 causes the iGPU 11 and the dGPU 13 to operate in accordance with the power control mode instructed by the operation information. That is, the performance control unit 217 refers to the power control mode to identify, for each processor, the PL1 range and the PL2 in the power control mode, and notifies them to the drive control unit 403.

Further, in the case where startup of an app is instructed by operation information, the performance control unit 217 determines whether graphics setting information for the app is stored in the storage unit 221, and if so, identifies the processor set in the graphics setting information. If determining that the graphics setting information is not stored in the storage unit 221, the performance control unit 217 determines whether the parameters for the app or the OS include graphics processor information indicative of a processor for use in execution of the image processing of the app. If determining that the graphics processor information is included, the performance control unit 217 identifies the processor instructed by the graphics processor information. The performance control unit 217 causes the identified processor to execute the image processing of the app, without allowing execution by the other processors. In the graphics processor information, a power control mode pertaining to the image processing may also be instructed.

When a power control mode in which rated power is lower than predetermined rated power (hereinafter, this mode may be called a "low power control mode") is instructed as the power control mode of the main system 100, the setting unit 219 generates graphics setting information (image processing setting information) that indicates the iGPU 11 as a processor for use in executing the image processing of a started app, indicated by the startup application information stored in the storage unit 221.

When a power control mode in which rated power is not lower than the predetermined rated power (hereinafter, this mode may be called a "high power control mode") is instructed, the setting unit 219 erases (clears) the graphics setting information stored in the storage unit 221.

The power control mode of the main system 100 may be instructed by the operation information input from the HID 31 or from the outside of the information processing apparatus 1. The setting unit 219 may display, on the HID 31, a power control mode setting screen for setting the power control mode of the main system 100.

The setting unit 219 may generate graphics setting information indicative of a device for use in executing the image processing of an app instructed, in accordance with the operation information input from the HID 31 or from the outside of the information processing apparatus 1, and store the generated graphics setting information in the storage unit 221. The graphics setting information generated in accordance with the operation information will be called user-designated graphics setting information to be distinguished from other graphics setting information. The setting unit 219 may cause the startup application information to include user designation information indicative of an app for which user-designated graphics setting information has been stored (set) in the storage unit 221. The setting unit 219 does not erase the user-designated graphics setting information even when a high power control mode is instructed. The setting unit 219 can refer to the startup application information to distinguish the startup application information pertaining to the app instructed by the user designation information as the user-designated graphics setting information. The setting unit 219 may generate user-designated graphics setting information by updating (editing) part or the whole of the graphics setting information for the existing apps in accordance with the operation information input from the HID 31 or from the outside of the information processing apparatus 1.

Here, the setting unit 219 may display, on the HID 31, a graphics setting screen for setting the graphics setting information.

The storage unit 221 stores the startup application information and the graphics setting information for each app (including the user-designated graphics setting information). The registry of the iGPU 11, for example, may be applied as the storage unit 221.

A configuration example of the power supply system 300 will now be described. The power supply system 300 is configured to include the PD controller 41, the charger 43, and the DC/DC converter 45.

The PD controller 41 controls power supplied to the DC/DC converter 45 on the basis of the processor state information input from the PM driver 213. The PD controller 41 determines total power by adding consumed power due to the conversion of power in the DC/DC converter 45 or the like to the sum of power as the sum of the values of power consumption required in each device, and outputs a power request signal indicative of the determined total power to the AD adapter 91. The sum of power includes power consumption for each processor indicated in processor state information.

The PD controller 41 may detect the state of charge of the battery pack 47 (FIG. 1) to control charging from the charger 43 to the battery pack 47 on the basis of the detected state of charge. For example, when the electromotive force (battery voltage) of the battery pack 47 is a predetermined full charge voltage or more, the PD controller 41 outputs, to the charger 43, charge control data indicative of a charge stop to stop charging to the charger 43. When the electromotive force of the battery pack 47 is less than the predetermined full charge voltage, the PD controller 41 outputs, to the charger 43, charge control data indicative of charge execution to execute charging to the charger 43. The PD controller 41 may preset charge control data including set values of maximum charging current and maximum charging voltage to the charger 43, to cause the charger 43 to perform charging with the maximum charging current or less and the maximum charging voltage or less instructed by the set values.

It should be noted that the AD adapter 91 converts AC power supplied thereto to DC power. The AD adapter 91 supplies, to the information processing apparatus 1, DC power of the amount of total power indicated by the power request signal input from the PD controller 41. The information processing apparatus 1 and the AD adapter 91 are connected through, for example, a USB cable capable of transmitting various data in compliance with the USB 3.2 standard. The USB cable has a signal line and a power line.

The charger 43 controls the charging of power, supplied from the AD adapter 91, to the battery pack 47 on the basis of the charge control data input from the PD controller 41. The charger 43 charges, to the battery pack 47, power left unconsumed out of the power supplied from the AD adapter 91.

The DC/DC converter 45 converts the voltage of power supplied from the AD adapter 91 to a predetermined voltage required for the operation of each of the devices that constitute the information processing apparatus 1, and supplies the power of the converted voltage to the respective devices. When no power is supplied from the AD adapter 91, the DC/DC converter 45 converts power supplied from the battery pack 47 as the input voltage, and supplies the power of the predetermined voltage to each device.

A configuration example of the temperature control system will now be described. The temperature control system 400 is configured to include the temperature sensors 51 and 53, a temperature measuring unit 401, a drive control unit 403, a temperature control table 405, the drive circuit 77, and the heat dissipation fan 73. The temperature measuring unit 401, the drive control unit 403, and the temperature control table 405 may be implemented as some of the functions of the EC 27, or may be implemented as some of the functions of the iGPU 11.

The temperature sensors 51 and 53 each output, to the temperature measuring unit 401, a temperature signal indicative of a physical quantity (for example, a thermoelectromotive force) pertaining to the detected temperature. The temperature sensors 51 and 53, as described above, can measure the surface temperatures of the iGPU 11 and the dGPU 13, respectively.

The temperature measuring unit 401 measures the temperatures corresponding to the physical quantities indicated by the temperature signals input respectively from the temperature sensors 51 and 53, at each predetermined amount of time (for example, every 0.1 to 5 seconds). The temperature measuring unit 401 outputs temperature data indicative of the measured temperatures to the drive control unit 403.

The drive control unit 403 determines the operating state of the heat dissipation fan on the basis of the power control mode indicated by the power control mode information input from the performance control unit 217 and the temperatures indicated by the temperature data input from the temperature measuring unit 401. The drive control unit 403 refers to the temperature control table 405 to determine an operating amount according to the power control mode and the temperatures. However, the operating amount determined according to the power control mode for the iGPU 11 and the temperature detected by the temperature sensor 51 can be different from the operating amount determined according to the power control mode for the dGPU 13 and the temperature detected by the temperature sensor 53. Therefore, the drive control unit 403 determines one operating amount used to drive the heat dissipation fan from the two operating amounts determined respectively for the iGPU 11 and the dGPU 13. For example, the drive control unit 403 may adopt the larger one of the two operating amounts, or may adopt an average thereof. The drive control unit 403 generates a drive control signal indicative of the determined operating amount, and outputs the generated drive control signal to the drive circuit 77.

The temperature control table 405 is configured to include, for each power control mode, at least one stage of a set of operating amount and operating temperature of the heat dissipation fan 73. The operating temperature is a temperature, in response to a tendency of rise of the temperatures detected by the temperature sensors 51 and 53, to instruct the heat dissipation fan 73 to start operation with an operating amount corresponding to that operating temperature. When the temperature tends to increase and exceeds an operating temperature at a certain stage in the power control mode at that time, the drive control unit 403 determines the operating amount corresponding to the operating temperature at that stage. When the temperature tends to decrease and falls below an operating temperature of a certain stage by a predetermined decreasing width (of, e.g., 2 to 3[° C.]) in the power control mode at that time, the drive control unit 403 determines the operating amount corresponding to an operating temperature of a stage that is one stage lower than the operating temperature at that stage. It should be noted that when there is no output corresponding to the operating temperature of the one-stage lower stage, i.e., when the operating amount of the 0-th stage is determined, the drive control unit 403 determines to stop, and outputs a drive control signal indicative of the stop to the drive circuit 77. A common temperature control table may be provided for the temperatures measured respectively in the temperature sensors 51 and 53, or separate temperature control tables may be provided therefor. In the separate temperature control tables, sets of operating amounts and operating temperatures different from each other may be set.

The drive circuit 77 supplies to the heat dissipation fan 73 the power corresponding to the operating amount indicated by the drive control signal input from the drive control unit 403. The amount of heat generated in the main system 100 depends primarily on the amounts of heat generated in the iGPU 11 and the dGPU 13 among the electronic devices. Controlling the rotational speed of the heat dissipation fan 73 on the basis of the temperature T and the power control mode enables heat dissipation according to the temperature rise due to heat generation.

A data flow in voltage control according to the present embodiment will now be described.

Figure 3:
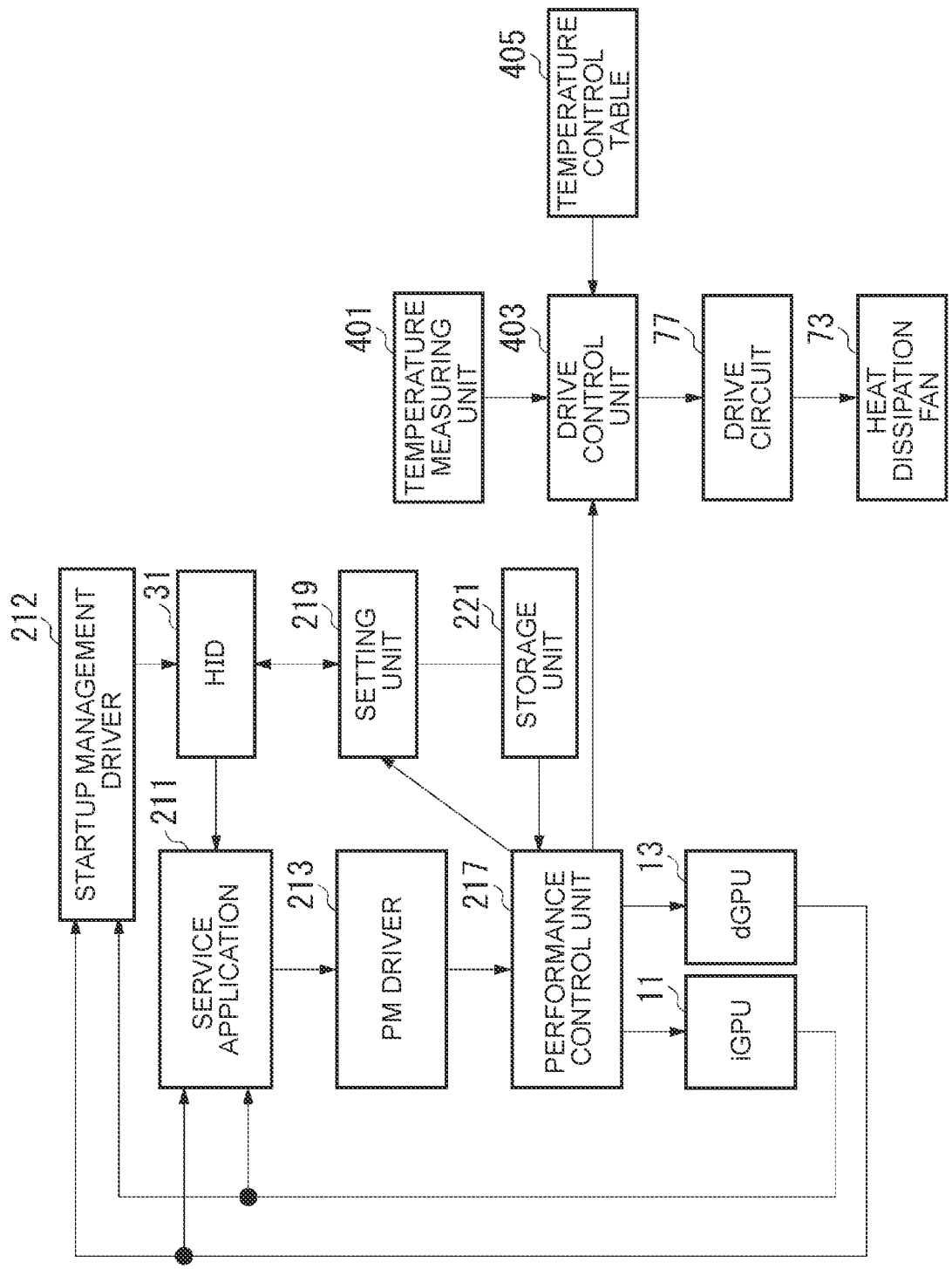
FIG. 3 is a schematic block diagram illustrating an example of a data flow in voltage control according to the present embodiment.

FIG. 3 is a schematic block diagram illustrating an example of the data flow in voltage control according to the present embodiment.

The service application 211 detects the respective states of the iGPU 11 and the dGPU 13, and outputs processor state information indicative of the detected states to the PM driver 213.

The startup management driver 212 monitors operation information input from the iGPU 11, the dGPU 13, and the HID 31 to detect startup of an app, and stores startup application information indicative of the app that has been started, to the storage unit 221.

The PM driver 213 outputs, to the performance control unit 217, the processor state information input from the service application 211. The processor state information includes information on the power consumption of the iGPU 11 and the presence or absence of the operation of the dGPU 13, and when the dGPU 13 is in operation, further includes information on the power consumption of the dGPU 13. The processor state information also includes information on the temperatures of the iGPU 11 and the dGPU 13.

The setting unit 219 is notified of the power control mode by an operation signal from the HID 31 or by a command from the performance control unit 217. When the notified power control mode is a low power control mode, the setting unit 219 sets, for each of the started applications indicated by the startup application information stored in the storage unit 221, graphics setting information that indicates the iGPU 11 as a processor to execute the image processing, and stores the graphics setting information in the storage unit 221. When the notified power control mode is a high power control mode, the setting unit 219 erases the graphics setting information stored in the storage unit 221. However, the setting unit 219 does not erase the user-designated graphics setting information. It should be noted that the setting unit 219 may display a graphics setting screen on the HID 31 and generate the user-designated graphics setting information on the basis of the operation information from the HID 31.

The performance control unit 217 controls the processing power of the iGPU 11 and the dGPU 13 on the basis of the processor state information input from the PM driver 213.

The performance control unit 217 determines the power control mode of the main system 100 in accordance with the changing tendency of the power consumption of the main system 100. The setting unit 219 may display a power control mode setting screen on the HID 31. In the case where the power control mode is instructed by the operation information input from the HID 31, the performance control unit 217 determines the power control mode of the main system 100 to be the instructed power control mode.

The performance control unit 217 outputs power control mode information indicative of the determined power control mode to the drive control unit 403.

The performance control unit 217 determines, for each of the iGPU 11 and the dGPU 13, the PL1 range and the PL2 corresponding to the determined power control mode. The performance control unit 217 sets the PL1 range and the PL2 determined for the iGPU 11 and the dGPU 13, to the registers of the iGPU 11 and the dGPU 13, respectively. The iGPU 11 and the dGPU 13 each control the power consumption on the basis of the PL1 range and the PL2 determined by the performance control unit 217.

However, in the case where startup of the app for which the graphics setting information has been stored in the storage unit 221 is instructed, the performance control unit 217 causes the processor instructed by the graphics setting information to execute the image processing of that app, without allowing the execution by the other processors.

The temperature measuring unit 401 outputs, to the drive control unit 403, the temperature data indicative of the temperatures detected from the physical quantities indicated by the temperature signals input respectively from the temperature sensors 51 and 53.

The drive control unit 403 refers to the preset temperature control table 405 to determine the operating amount of the heat dissipation fan 73 on the basis of the power control mode notified from the performance control unit 217 and the temperatures indicated by the temperature data input from the temperature measuring unit 401. In the case where the operating amount based on the temperature detected by the temperature sensor 51 and the power control mode of the iGPU 11 differs from the operating amount based on the temperature detected by the temperature sensor 53 and the power control mode of the dGPU 13, the drive control unit 403 adopts the larger one of the operating amounts, for example.

The drive control unit 403 generates a drive control signal indicative of the determined operating amount, and outputs the generated drive control signal to the drive circuit 77.

The drive circuit 77 supplies to the heat dissipation fan 73 the power corresponding to the operating amount indicated by the drive control signal input from the drive control unit 403.

The heat dissipation fan 73 operates consuming the power supplied from the drive circuit 77.

(Power Control Mode)

Examples of power control modes according to the present embodiment will now be described. FIG. 4 is an explanatory diagram illustrating examples of the power control modes according to the present embodiment. Three stages of power control modes illustrated in FIG. 4 are: a low noise mode (Q: Quiet), a balance mode (B: Balance), and a high performance mode (P: Performance). Each power control mode is characterized by the surface temperature, the noise level, and the set power. In the present embodiment, the power control mode may be instructed by the operation information, or may be controlled in accordance with the operating state of the main system 100. In this example, the low noise mode (Q) and the balance mode (B) are set to be low power control modes, and the high performance mode (P) is set to be a high power control mode. In the low power control mode, the iGPU 11 operates and the dGPU 13 does not operate. In the high power control mode, the iGPU 11 and the dGPU 13 both operate. Thus, by making the iGPU 11 perform image processing and the dGPU 13 not perform image processing in the low power control mode, the event that the processing power could not be fulfilled according to the increase in power consumption can be resolved.

FIG. 5 is a diagram illustrating an example of a power control table according to the present embodiment.

The low noise mode (Q) is a power control mode focusing on the reduction in level of noise caused by the operation of the heat dissipation fan 73. As a noise level parameter, a noise upper limit is kept low as SND1 [dB]. Since the opportunity to let the heat dissipation fan 73 operate or the output of the heat dissipation fan 73 is suppressed, the PL111 of the iGPU 11, as a set power parameter, has its upper limit P0111$qu$ [W] and lower limit P0111$q1$ [W] both kept lower than those of the PL111 in the other power control modes. Therefore, this mode is suitable in the case where the processing power is relatively low or in the case where quick response is not required. For example, the low noise mode (Q) is applied to relatively low-load processing, such as document editing or browsing by a document creation app, browsing of a web page by a browser, making a telephone call, and sending or receiving email. The amount of image processing accompanying such processing is relatively small. For the PL131 of the dGPU 13 as well, its upper limit P0131$qu$ [W] and lower limit P0131$q1$ [W] are both kept lower than those of the PL131 in the other power control modes. It should be noted that P0111$qu$ may be set to a value equal to P0111$q1$. In this case, the fluctuation of PL111 is not allowed, and PL111 is fixed to P0111$qu$ or P0111$q1$. Similarly, P0131$qu$ may be set to a value equal to P0131$q1$.

The balance mode (B) is a power control mode focusing on the balance between the reduction of noise level and the fluctuation of processing power. The PL111 range for the iGPU 11 pertaining to the balance mode (B) has an upper limit P0111$bu$ [W] and a lower limit P0111$b1$ [W]. This range is intermediate between the PL111 range pertaining to the low noise mode (Q) and the PL111 range pertaining to the high performance mode (P). That is, the following holds: P0111$p1$≥P0111$bu$≥P0111$b1$≥P0111$qu$. The PL131 range for the dGPU 13 pertaining to the balance mode (B) has an upper limit PO131$bu$ [W] and a lower limit P0131$b1$ [W]. For this range as well, the following holds: P0131$p1$≥P0131$bu$≥P0131$b1$≥P0131$qu$.

The noise upper limit pertaining to the balance mode (B) is SND2 [dB], which is intermediate between the noise upper limit SND1 pertaining to the low noise mode (Q) and a noise upper limit SND3 pertaining to the high performance mode (P). Therefore, this mode is suitable for processing in which the power consumption does not become excessive although the state of moderate power consumption continues. The balance mode (B) may be applied, for example, to opening a large-capacity file, installing an app, executing an app for security measures, or executing a CAD app.

The high performance mode (P) is a power control mode for making full use of the processing power of a processor. The PL111 for the iGPU 11 pertaining to the high performance mode (P) has a lower limit P0111$p1$ [W] which is not lower than the PL111 in the other power control modes, and an upper limit P0111$pu$ [W] which may take a value equivalent to P0112 set for the PL112. The PL131 for the dGPU 13 pertaining to the high performance mode (P) has a lower limit P0131$p1$ [W] which is not lower than the PL131 in the other power control modes, and an upper limit P0131$pu$ [W] which may take a value equivalent to P0132 set for the PL132. Therefore, the PL111 range and the PL131 range pertaining to the high performance mode (P) become wider than the PL111 ranges and the PL131 ranges, respectively, pertaining to the other power control modes.

In the high performance mode (P), which is selected when more processing power is required, noise due to the operation of the heat dissipation fan 73 is permitted. The noise upper limit SND3 [dB] pertaining to the high performance mode (P) is higher than the noise upper limits in the other power control modes. Therefore, this mode is suitable for the cases where power consumption is continuously high or quick response is required. For example, the high performance mode (P) may be applied to video editing, streaming of large-capacity video, AR/VR simulation, and the like. Such processing may involve a large amount of image processing.

In the example illustrated in FIG. 5, target temperatures for the low noise mode (Q), the balance mode (B), and the high performance mode (P) are indicated as TEM1[° C.], TEM2[° C.], and TEM3[° C.], respectively. Here, it is sufficient if the following holds: TEM1≤TEM2≤TEM3. These temperatures are temperatures a user can tolerate when in contact with the surface of the chassis while using the information processing apparatus 1. Further, in the example illustrated in FIG. 5, the PL112 and the PL132 are P0112 and P0132 [W], respectively, irrespective of the power control mode. This allows a temporary rise in power consumption in any of the power control modes.

An example of a mode transition table will now be described. FIG. 6 is a diagram illustrating an example of the mode transition table according to the present embodiment. The mode transition table illustrated in FIG. 6 is configured to include mode transition conditions for each power control mode of the main system 100.

In the mode transition table, upgrading conditions are arranged in descending order of the PL1 in a power control mode after being changed, i.e., in the order of the high performance mode (P) and the balance mode (B). Further, downgrading conditions are arranged in ascending order of the PL1 in a power control mode after being changed, i.e., in the order of the low noise mode (Q) and the balance mode (B). The order of these mode transition conditions corresponds to the priority of the mode transition conditions to be applied by the performance control unit 217.

The upgrading condition to the high performance mode (P) is that the power consumption of the main system 100 continues to be SP113 or more for a duration of T113 or more.

The upgrading condition to the balance mode (B) is that the power consumption of the main system 100 continues to be SP112 or more for a duration of T112 or more. Here, SP113 takes a greater value than SP112. SP112 may fall within the PL111 range in the balance mode (B) of the iGPU 11 or may be smaller than the lower limit of the PL111. SP113 may fall within the PL111 range in the high performance mode (P) of the iGPU 11 or may be smaller than the lower limit of the PL111. T113 may be equal to, or greater than, T112.

The downgrading condition to the low noise mode (Q) is that the power consumption of the main system 100 continues to be SP121 or less for a duration of T121 or more.

The downgrading condition to the balance mode (B) is that the power consumption of the main system 100 continues to be SP122 or less for a duration of T122 or more. Here, SP121 takes a smaller value than SP122. SP121 may fall within the PL111 range in the low noise mode (Q) or may be smaller than the lower limit of the PL111. SP121 may be equal to, or greater than, SP112. SP122 may fall within the PL111 range in the balance mode (B) or may be smaller than the lower limit of the PL111. SP122 may be equal to, or greater than, SP113. T121 may be equal to, or smaller than, T122.

As illustrated in FIG. 6, an upgrading condition to a power control mode with higher PL1 tends to be more difficult to satisfy unless a state with high power consumption continues.

Thus, in the case where upgrading conditions to two or more power control modes are satisfied, the performance control unit 217 identifies the upgrading condition to a power control mode with the highest PL1 from among the satisfied upgrading conditions, and gives priority to a transition to the power control mode pertaining to the identified upgrading condition. This enables an immediate transition to a power control mode with the highest possible PL1 in a phase in which a state of high power consumption or the operating state continues.

On the other hand, a downgrading condition to a power control mode with lower PL1 tends to be more difficult to satisfy unless a state with low power consumption continues.

Thus, in the case where downgrading conditions to two or more power control modes are satisfied, the performance control unit 217 identifies the downgrading condition to a power control mode with the lowest PL1 from among the satisfied downgrading conditions, and gives priority to a transition to the power control mode pertaining to the identified downgrading condition. This enables an immediate transition to a power control mode with the lowest possible PL1 in a phase in which a state of low power consumption or the stopped state continues.

Further, by prioritizing the upgrading conditions satisfied by the main system 100 over the downgrading conditions, the required processing power can be fulfilled and heat dissipation can be promoted in preparation for the occurrence of a phase in which a state of high power consumption or the operating state continues unexpectedly.

Figure 7:
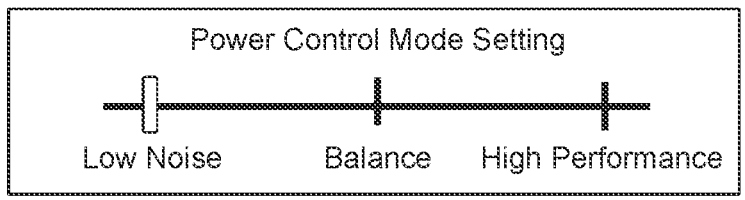
FIG. 7 is a diagram illustrating an example of a power control mode setting screen.

Specific examples of setting screens will now be described. FIG. 7 is a diagram illustrating an example of a power control mode setting screen. The power control mode setting screen is a screen for selecting, with an operation, the power control mode of the main system 100. The power control mode setting screen illustrated in FIG. 7 includes a slider bar for the main system 100. The slider bar illustrated includes items of low noise mode (Q), balance mode (B), and high performance mode (P) in this order from left to right. By adjusting the knob to the position of one of the items according to the operation, the power control mode pertaining to the item on which the knob is positioned is selected. In the illustrated example, the low noise mode (Q) has been selected.

Figure 8:
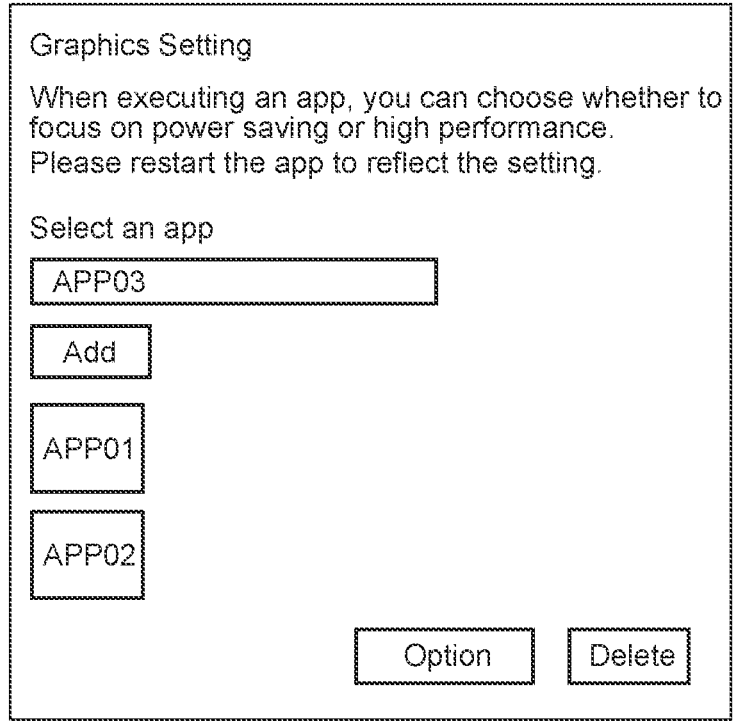
FIG. 8 is a diagram illustrating an example of an app selection screen.

FIG. 8 is a diagram illustrating an example of an app selection screen. The app selection screen illustrated in FIG. 8 is a screen that shows an app as a target of setting of graphics setting information, and a list of apps for which the graphics setting information has already been set. In the illustrated example, an app APP03 has been instructed as a target of setting. The button on which "ADD" is displayed functions as a button for instructing a display of a graphics setting screen for setting graphics setting information for the instructed APP03. APP01 and APP02 are icons indicating the apps for which the graphics setting information has already been set. These icons each function as a button, when depressed, for instructing a display of a graphics setting screen pertaining to the app.

Figure 9:
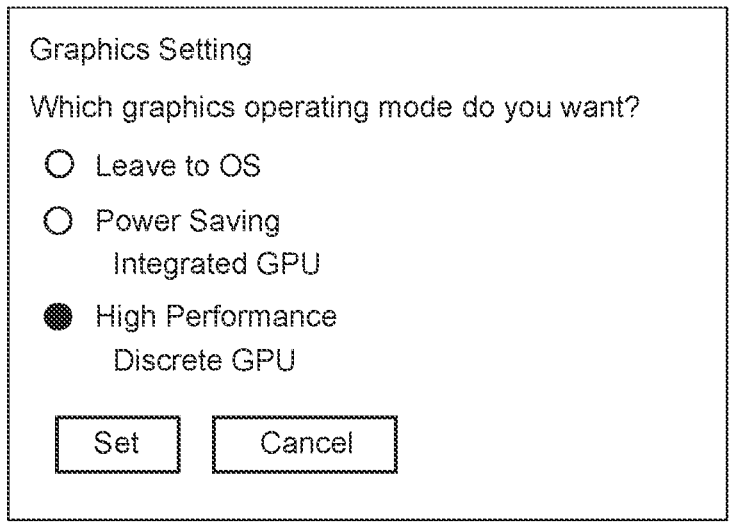
FIG. 9 is a diagram illustrating an example of a graphics setting screen.

FIG. 9 is a diagram illustrating an example of a graphics setting screen. The graphics setting screen illustrated in FIG. 9 is a screen for setting, for an individual app, an operating mode in image processing. In the illustrated example, one of three items is selectable. "Leave to OS" indicates the processor instructed by the graphics processor information which is an OS parameter. "Power saving: integrated GPU" indicates the iGPU 11. "High performance: discrete GPU" indicates the dGPU 13. The "SET" button is a button for instructing a creation of graphics setting information. The "CANCEL" button is a button for instructing a stop of creation of the graphics setting information. In response to depression of the "CANCEL" button, the setting unit 219 clears the display of the graphics setting screen.

Figure 10:
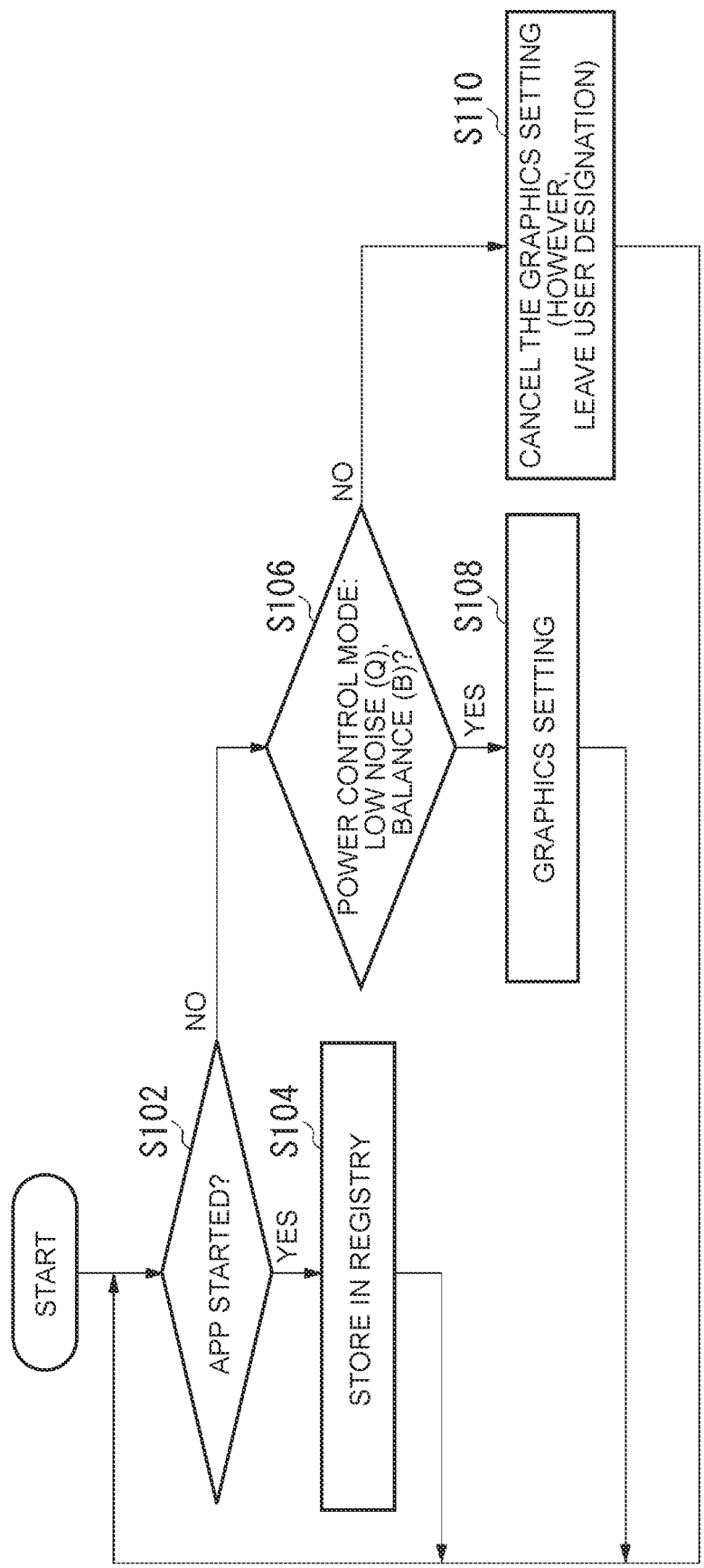
FIG. 10 is a flowchart illustrating an example of graphics setting processing according to the present embodiment.

FIG. 10 is a flowchart illustrating an example of graphics setting processing according to the present embodiment.

(Step S102) The startup management driver 212 monitors operation information input from the iGPU 11, the dGPU 13, and the HID 31, to determine whether startup of an app has been detected. If so (YES in step S102), the process proceeds to step S104. Otherwise (NO in step S102), the process proceeds to step S106.

(Step S104) The startup management driver 212 stores the startup application information in the storage unit 221 (e.g., the registry of the iGPU 11). The process then returns to step S102.

(Step S106) The setting unit 219 determines whether the power control mode of the main system 100 is a low power control mode (low noise mode (Q) or balance mode (B)). If it is a low power control mode (YES in step S106), the process proceeds to processing in step S108. If it is a high power control mode (high performance mode (P)) (NO in step S106), the process proceeds to processing in step S110.

(Step S108) For each of the started applications indicated in the startup application information stored in the storage unit 221, the setting unit 219 sets graphics setting information that indicates the iGPU 11 as a processor to execute image processing, and stores the information in the storage unit 221.

(Step S110) The setting unit 219 erases (cancels) the graphics setting information stored in the storage unit 221. However, the user-designated graphics setting information is left without being erased. The process then returns to the processing in step S102.

Figures 11, 12, 13:
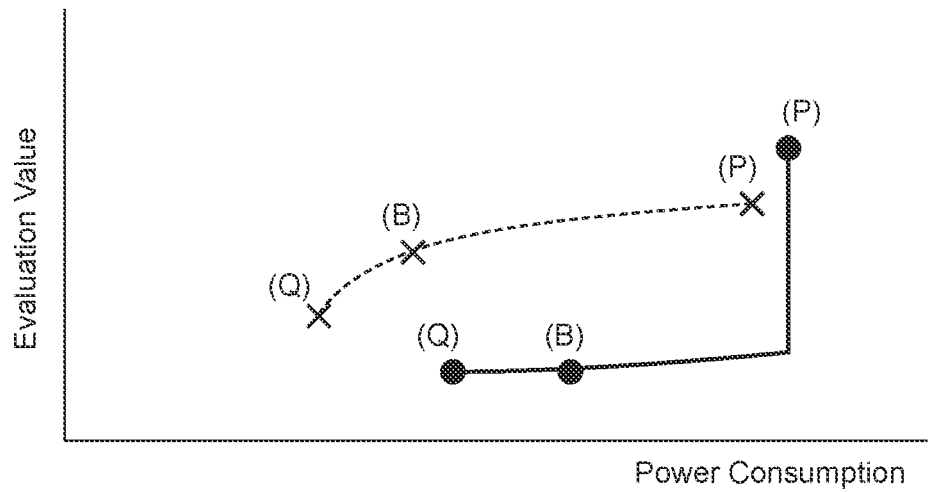
FIG. 11 is a diagram illustrating startup application information according to the present embodiment.
FIG. 12 is a table illustrating verification results for the information processing apparatus according to the present embodiment.
FIG. 13 is a diagram illustrating evaluation values for a conventional information processing apparatus.

An example of startup application information will now be described. FIG. 11 is a diagram illustrating startup application information according to the present embodiment. In the illustrated example, the startup application information includes, for each started app, information on a processor to execute the image processing and user designation information, which are associated with each other. For APP01 to APP03, the iGPU 11 is designated, and for APP04 and APP05, the dGPU 13 is designated. The user designation information is set for APP03 and APP05. That is, the user-designated graphics setting information has been set for APP03 and APP05, which is not erased even when the power control mode becomes a high power control mode.

Benchmark software involving predetermined image processing was executed in the low noise mode (Q) in (1) a system in which the processor is an iGPU alone, (2) the present embodiment (where the iGPU 11 operates and the dGPU 13 is stopped), and (3) a system in which both iGPU and dGPU operate (conventional SWG), for verification of performance evaluation values and surface temperatures. FIG. 12 illustrates the verification results. In the illustrated example, the evaluation value is best in (1), followed by (2). However, the difference between (1) and (2) is slight, and there are significant differences between (1) and (3) and between (2) and (3). The temperatures are almost equal in (1) to (3). These results indicate that, in the system having both the iGPU 11 and the dGPU 13, operating the iGPU 11 while not operating the dGPU 13 in the case of a low power control mode can avoid the performance degradation that might occur when operating both the iGPU 11 and the dGPU 13.

As described above, the information processing apparatus 1 according to the present embodiment includes: the first processor (e.g., the iGPU 11), the second processor (e.g., the dGPU 13), and the power control unit (e.g., the performance control unit 217) that determines one power control mode from among a plurality of stages of power control modes different in rated power, and controls power consumption of the first processor and the second processor in the determined power control mode. When the determined power control mode is a low power control mode (e.g., low noise mode (Q), balance mode (B)) which is a power control mode with the rated power lower than predetermined rated power, the power control unit stops an operation of the second processor.

According to this configuration, when the power control mode of the computer system of the information processing apparatus 1 is a low power control mode with low rated power, the performance corresponding to the increase in amount of power consumption is obtained by the first processor, without relying on the second processor. On the other hand, when the power control mode is a high power control mode, the first and second processors function together. Therefore, in the high power control mode with high rated power, the functions of the first and second processors can be utilized when the amount of power consumption is high.

Further, when the determined power control mode is the low power control mode, the power control unit may stop the operation of the second processor and use the first processor to execute image processing. When the high power control mode with the rated power not lower than the predetermined rated power is instructed, the power control unit may use the first and second processors to execute the image processing.

According to this configuration, when the power control mode of the computer system is the low power control mode, the first processor is caused to execute the image processing, so that the performance corresponding to the increase in amount of power consumption can be obtained. On the other hand, when the power control mode is the high power control mode, the first and second processors are caused to execute the image processing, so that the image processing functions of the first and second processors can be fulfilled.

The information processing apparatus 1 may also include the storage unit (e.g., the storage unit 221) that stores startup application information indicative of an application program that has been started. The information processing apparatus 1 may also include the setting unit (e.g., the setting unit 219) that is operable, in response to the determined power control mode being the low power control mode, to set image processing setting information (e.g., the graphics setting information) indicating the first processor as the processor to execute image processing of the application program indicated by the startup application information, and is operable, in response to the high power control mode being instructed, to erase the image processing setting information.

Further, the power control unit may cause the image processing of the application program for which startup has been instructed to be executed by the processor that is instructed by the image processing setting information pertaining to the application program.

With this configuration, for the application program executed, the first processor can be used to execute the image processing in the low power control mode, and in the high power control mode, the restriction on the image processing that the first processor is used for the image processing can be lifted.

Further, the setting unit may set image processing setting information (e.g., the graphics setting information) indicating a processor to execute image processing of an application program instructed by a user operation (e.g., the operation information input from the HID 31), as user-designated image processing setting information (e.g., the user-designated graphics setting information), and may maintain the user-designated image processing setting information when a high power control mode is instructed.

With this configuration, a processor to execute image processing of a desired application program may be set as desired by user operation. Even when a high power control mode is instructed, the user-designated image processing setting information is maintained without being erased, so that the user's preference for the processor pertaining to execution of an application program, set by the user operation, is respected.

Further, the storage unit may store user designation information indicative of an application program for which the user-designated image processing setting information has been set.

This configuration allows the application program for which the user-designated image processing setting information has been set to be easily identified. So when a high power control mode is instructed, even if the above application program corresponds to the application program indicated by the startup application information, the user-designated image processing setting information is prevented from being erroneously erased.

It should be noted that the various setting information pertaining to the above processing and the parameters and other setting items are not limited to those illustrated above, and may differ according to various requirements such as the processing power of the processors, the number of the processors, the size of the chassis, and the like. For example, the number of iGPUs may be two or more. The number of dGPUs may also be two or more. A processor other than the iGPU and dGPU, such as a signal processing processor (digital signal processor (DSP)), may be included. The performance control unit 217 only needs to be able to control the power control mode and power consumption of the main system 100 according to the state thereof.

While the case where the low noise mode (Q) and the balance mode (B) are low power control modes and the high performance mode (P) is a high power control mode has been taken as an example, the classification of low power control mode and high power control mode may differ depending on the specifications of the individual processors. For example, the low noise mode (Q) may be the low power control mode, and the balance mode (B) and the high performance mode (P) may be the high power control modes.

Further, the number of stages of power control modes, the upper limits of PL111 and PL131, the lower limits of PL111 and PL131, and the values of PL112, SP112, T112, SP121, T121, and others pertaining to each stage, the number of stages of output of the heat dissipation fan 73, and the output and operating temperature at each stage may also be different from those illustrated above. In the case where the values of SP112, SP121, and the like are determined with reference to the upper or lower limit of PL1, they may be omitted in the temperature control table. Further, in the case where the values of T11 and T12 are constant irrespective of the power control mode, they may be omitted in the temperature control table.

Further, when determining the continuation of the state of the main system 100, the performance control unit 217 may use, as a value indicative of the power consumption of each of the iGPU 11 and the dGPU 13, a representative value such as a moving average or a median representing the changing tendency of the power consumption up to that point, instead of the instantaneous value thereof. The moving average may be, for example, an exponentially weighted moving average, or a simple moving average within a predetermined period (of, e.g., 1 to 20 [s]) up to the time of interest.

The above parameters may be made changeable according to an operation signal generated in response to an operation accepted by the HID 31. The performance control unit 217 may determine a power control mode in accordance with the operation signal input from the HID 31, or may cancel the designation of the power control mode determined in accordance with the operation signal. The drive control unit 403 controls the operation of the heat dissipation fan 73 in accordance with the power control mode determined by the performance control unit 217 as described above. For example, by making the low noise mode (Q) selectable in accordance with an operation, the information processing apparatus 1 can be operated in a manner appropriate for quiet environments, such as in a library, a work room, and the like.

The information processing apparatus 1 may include a video memory separate from the system memory 21. The video memory is used as an area for reading execution programs dedicated to the dGPU 13, or as a working area for writing processing data (mainly, display data) of the execution programs of the dGPU 13. Providing the video memory separate from the system memory 21 can avoid the degradation in processing speed even when the loads on both the iGPU 11 and the dGPU 13 increase. In this case, the system memory 21 may not be shared with the dGPU 13.

While the embodiments of the present invention have been described in detail with reference to the drawings, specific configurations are not limited to the above embodiments and include designs and others within the scope of the gist of the invention. The configurations described in the above embodiments can be combined in any manner.

DESCRIPTION OF SYMBOLS 1 information processing apparatus
11 iGPU
13 dGPU
21 system memory
27 EC
31 HID
40 power supply circuit
41 PD controller
43 charger
45 DC/DC converter
47 battery pack
51, 53 temperature sensor
73 heat dissipation fan
77 drive circuit
91 AD adapter
100 main system
101 OS
200 performance control system
201 state detection unit
211 service application 212 startup management driver
213 PM driver
217 performance control unit
219 setting unit
221 storage unit
300 power supply system
400 temperature control system
401 temperature measuring unit
403 drive control unit
405 temperature control table

The invention claimed is:

1. An information processing apparatus comprising:
a first processor;
a second processor; and
a microcomputer that:
   determines one power control mode from among a plurality of stages of power control modes different in rated power,
   controls power consumption of the first processor and the second processor in the determined power control mode,
   in response to the determined power control mode being a low-power control mode, stops an operation of the second processor,
   stores startup application information indicative of an application program that has been started,
   sets image processing setting information that indicates the first processor as a processor to execute image processing of an application program indicated by the startup application information in response to the determined power control mode being the low-power control mode, and
   erases the image processing setting information in response to the high-power control mode being instructed.

2. The information processing apparatus according to claim 1, wherein the microcomputer:
   sets, as user-designated image processing setting information, image processing setting information indicative of a processor to execute image processing of an application program instructed by a user operation, and
   maintains the user-designated image processing setting information in response to the high-power control mode being instructed.

3. The information processing apparatus according to claim 2, wherein the microcomputer stores user designation information indicative of an application program for which the user-designated image processing setting information has been set.

4. The information processing apparatus according to claim 1, wherein the microcomputer causes image processing of an application program for which startup has been instructed to be executed by a processor instructed by the image processing setting information pertaining to the application program.

5. A control method for an information processing apparatus including a first processor and a second processor, the control method causing the information processing apparatus to execute:
   determining one power control mode from among a plurality of stages of power control modes different in rated power;
   controlling power consumption of the first processor and the second processor in the determined power control mode;
   stopping an operation of the second processor in response to the one power control mode being a low power control mode which is a power control mode with the rated power lower than predetermined rated power;
   storing startup application information indicative of an application program that has been started;
   setting image processing setting information that indicates the first processor as a processor to execute image processing of an application program indicated by the startup application information in response to the determined power control mode being the low-power control mode; and
   erasing the image processing setting information in response to the high-power control mode being instructed.

* * * * *